(12) United States Patent
Steensgaard et al.

(10) Patent No.: US 8,825,719 B2
(45) Date of Patent: Sep. 2, 2014

(54) INCREMENTAL LOCK-FREE STACK SCANNING FOR GARBAGE COLLECTION

(75) Inventors: Bjarne Steensgaard, Bothell, WA (US); Erez Petrank, Redmond, WA (US); Gabriel Kliot, Haifa (IL)

(73) Assignee: Microsoft Corporation, Redmond, WA (US)

( * ) Notice: Subject to any disclaimer, the term of this patent is extended or adjusted under 35 U.S.C. 154(b) by 1225 days.

(21) Appl. No.: 12/261,920

(22) Filed: Oct. 30, 2008

(65) Prior Publication Data

US 2010/0114998 A1     May 6, 2010

(51) Int. Cl.
*G06F 17/30*     (2006.01)
*G06F 12/02*     (2006.01)

(52) U.S. Cl.
CPC ................... *G06F 12/0269* (2013.01)
USPC ............. 707/813; 707/E17.002; 707/E17.005

(58) Field of Classification Search
CPC combination set(s) only.
See application file for complete search history.

(56) References Cited

U.S. PATENT DOCUMENTS

| | | | |
|---|---|---|---|
| 6,430,580 B1 * | 8/2002 | Azagury et al. | 1/1 |
| 6,502,111 B1 | 12/2002 | Dussud | |
| 6,581,063 B1 * | 6/2003 | Kirkman | 1/1 |
| 6,769,004 B2 | 7/2004 | Barrett | |
| 6,826,583 B1 * | 11/2004 | Flood et al. | 1/1 |
| 7,062,519 B2 | 6/2006 | Garthwaite | |
| 7,089,273 B2 | 8/2006 | Wu et al. | |
| 7,412,580 B1 * | 8/2008 | Garthwaite | 711/165 |
| 7,584,232 B2 * | 9/2009 | Guo | 1/1 |
| 7,779,054 B1 * | 8/2010 | Printezis et al. | 707/813 |
| 2005/0021576 A1 * | 1/2005 | Barabash et al. | 707/206 |
| 2005/0132374 A1 * | 6/2005 | Flood et al. | 718/100 |
| 2005/0198088 A1 | 9/2005 | Subramoney et al. | |
| 2006/0190697 A1 | 8/2006 | Grant | |
| 2006/0218561 A1 | 9/2006 | Moir et al. | |
| 2007/0203960 A1 | 8/2007 | Guo | |

OTHER PUBLICATIONS

Barabash, et al., "A Parallel, Incremental, Mostly Concurrent Garbage Collector for Servers", at <<http://www.cs.technion.ac.il/~erez/Papers/mostly-concurrent-toplas.pdf>>, ACM, No. 27, No. 6, Nov. 2005, pp. 1097-1146.

Herlihy, et al., "Lock-Free Garbage Collection for Multiprocessors", at <<http://ieeexplore.ieee.org/iel4/71/3768/00139204.pdf?isnumber=3768&prod=STD&arnumber=139204&arnumber=139204&arSt=304&ared=311&arAuthor=Herlihy%2C+M.P.%3B+Moss%2C+J.E.B.>>, IEEE, vol. 3, No. 3, May 1992; pp. 304-311.

Michael, "Safe Memory Reclamation for Dynamic Lock-Free Objects Using Atomic Reads and Writes", at <<http://www.research.ibm.com/people/m/michael/podc-2002.pdf>>, ACM, 2002, pp. 10.

Printezis, et al., "A Generational Mostly-Concurrent Garbage Collector", at <<http://research.sun.com/techrep/2000/smli_tr-2000-88.pdf>>, 2000, pp. 33.

Wirth, "Incremental Garbage Collection: The Basic Algorithms", at <<http://ssw.jku.at/Teaching/Lectures/Sem/2005/Reports/Wirth.pdf>>, 2006, pp. 16.

\* cited by examiner

*Primary Examiner* — Shyue Jiunn Hwa
(74) *Attorney, Agent, or Firm* — Dan Choi; Carole Boelitz; Micky Minhas (57) ABSTRACT

Concurrent, incremental, and lock-free stack scanning for garbage collectors is disclosed. This method uses a summary table and return barriers to allow high responsiveness. The method also supports programs that employ fine-synchronization to avoid locks, imposes negligible overhead on program execution, can be used with existing concurrent collectors, and supports the special in-stack references existing in languages such as C#.

13 Claims, 8 Drawing Sheets

INCREMENTAL LOCK-FREE STACK SCANNING FOR GARBAGE COLLECTION

BACKGROUND

Garbage collection is widely acknowledged to speed up software development while increasing security and reliability. Garbage collection has been incorporated into modern popular languages such as C# or Java. However, garbage collectors may create pauses in the execution of the application, and they may add overhead that reduces efficiency.

When garbage collection was first proposed and implemented, the running software application was halted during garbage collection execution. These halts create pauses which may ultimately affect end users, particularly in a real-time operating system or when presenting a multimedia file.

Concurrent and on-the-fly garbage collectors may partially mitigate these pauses. Concurrent garbage collectors run concurrently with the application and only stop it for a short synchronization phase in the beginning or end of the collection. On-the-fly collectors are special concurrent collectors that do not need to stop all threads simultaneously. They stop the application one thread at a time, typically for scanning the thread runtime stack. However, for some modern on-the-fly garbage collectors, the remaining pause bottleneck is the stack scanning of a single thread, thus pauses may still occur.

SUMMARY

An incremental, concurrent, and lock-free stack scanning method that is suitable for all known on-the-fly collectors is disclosed. The term "incremental" as used herein indicates that the stack is not scanned all at once, but one frame at a time. The term "concurrent" as used herein indicates that the garbage collector (also "collector") may scan the frames while the mutator is executing. This requires synchronization between the collector and mutator. The term "lock-freedom" as used herein indicates that this synchronization is ensured at a fine-grained level, with no use of locks, and with progress guaranteed.

While the scan is incremental, the collector obtains the equivalent of an atomic snapshot of the stack. The mutator thread is required to scan only a single frame at a time. The mutator scans only if it is about to use or modify the frame and only if the collector was not fast enough to scan the frame earlier. This happens upon exit from a method (i.e., a subroutine), and is executed with an efficient return barrier. It is expected most of scanning work will be executed by the collector in parallel, thus off-loading memory management work from the application threads.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Although specific details of exemplary method are described below, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media may be any available media that may be accessed by a computing device to implement the instructions stored thereon.

Figure 1:
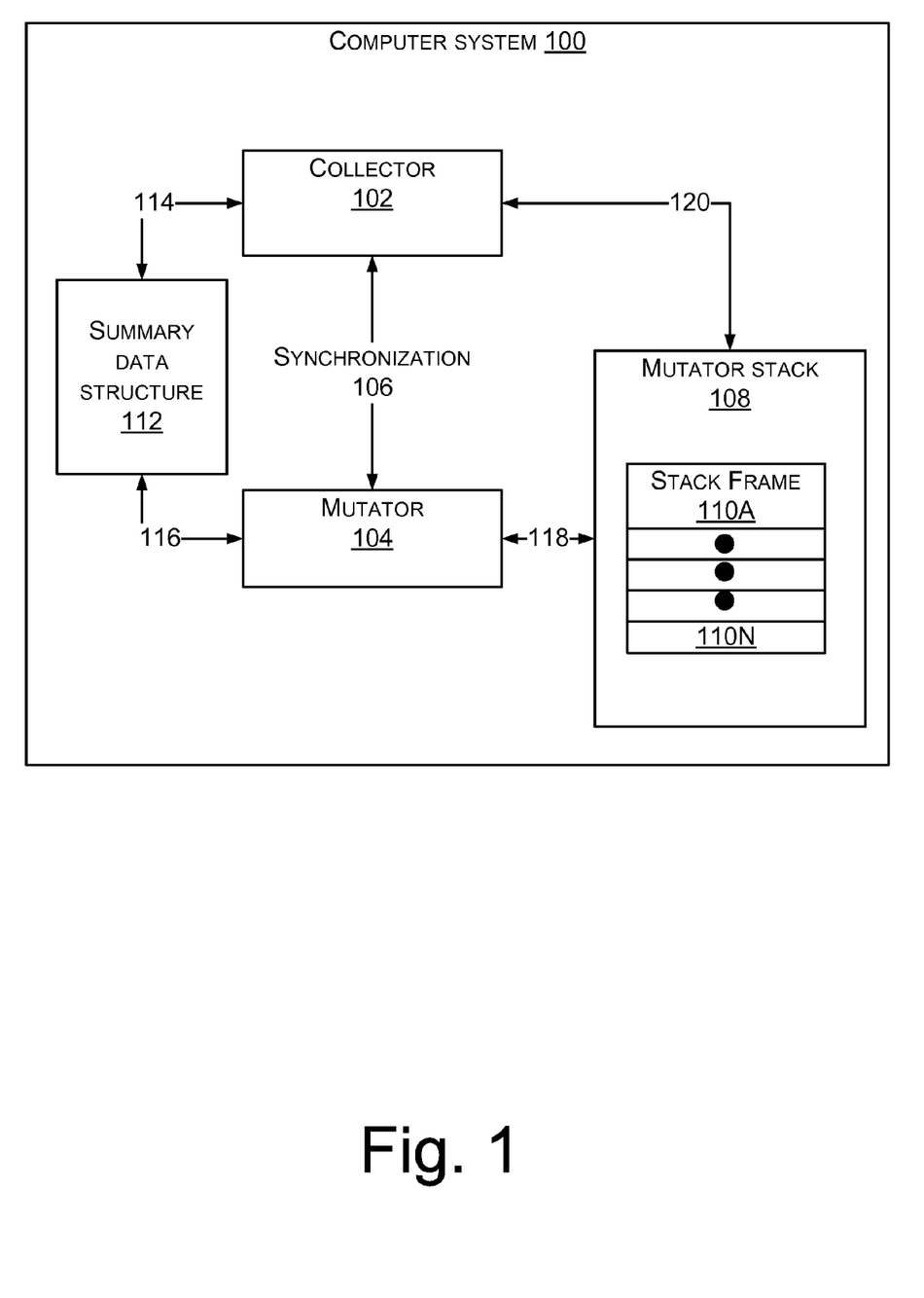
FIG. 1 is a schematic diagram of an exemplary computer system implementing garbage collection and utilizing a summary data structure.

FIG. 1 is an exemplary diagram of a computer system 100 incorporating a garbage collector (collector) 102, and a mutator 104. The collector 102 may include tracing, moving, reference-counting, or other similar implementations. A synchronization mechanism 106 is established between the garbage collector 102 and the mutator 104. The synchronization mechanism 106 prevents the collector 102 and mutator 104 from interfering with one another in undesired ways. A thread program stack 108 (stack or mutator stack) comprised of stack fragments such as frames 110A-110N is shown. The mutator 104 interacts with the stack 108 via a link 118, such as a bus or other path. The collector 102 also interacts with the stack 108 via a link 120, such as a bus or other path. Stack 108 may have interleaved program frames 110A-110N, (referred to generally herein as "frames 110") of managed code and frames 110A-110N that represent systems calls (that usually execute unmanaged code). In the case of moving collectors, objects directly pointed to from these unmanaged frames must generally be pinned and cannot be moved.

Whenever the collector 102 or the mutator 104 scan a stack frame, they record the resulting list of addresses referenced from the stack frames 110A-110N as a stack summary data structure 112 which is an atomic snapshot of the stack. The collector 102 and mutator 104 both interact with the summary data structure 112 via links 114 and 116, respectively, to accomplish the necessary functions of garbage collection and thread mutation in computer system 100. This interaction through the summary data structure 112 facilitates the synchronization 106.

Figure 2:
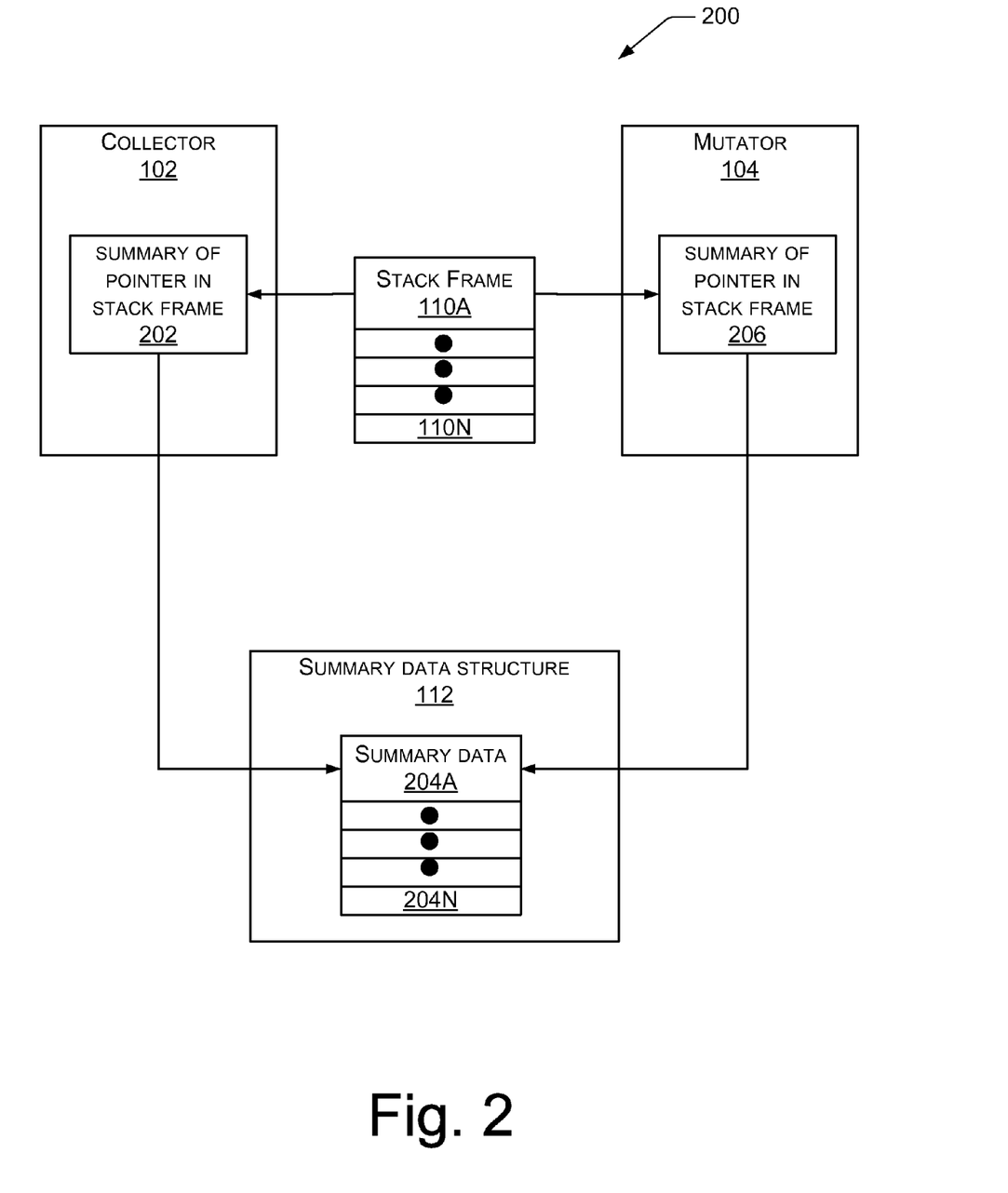
FIG. 2 is a schematic diagram illustrating building the summary data structure.

FIG. 2 is a schematic diagram illustrating building 200 the summary data structure. Summary data structure 112 may be separate from the stack 110. For simplicity, the process will be described with reference to the exemplary computer system 100 described above with reference to FIG. 1.

A garbage collector 102 scans the stack frame 110A. "Frame" in this application is used for convenience and may indicate a single frame, multiple frames, a section of frames, or other fragment of the stack. It is assumed that no live object in a program heap is reachable only from frames of unmanaged code, and so such frames are ignored. Stack scanning may be broken into small increments because if the thread can only change the pointers on the most recent stack frame, then the scanning of the other frames may be delayed until the thread finishes executing the current method. It is stipulated that there is enough known structure in the frames of the unmanaged code so that it is possible to jump over them and scan only frames of managed code.

Stack scanning typically requires compiler support. The compiler produces stack maps that indicate which slots in each stack frame hold pointers. To find the appropriate stack map to use, the scanning procedure finds the call site address, which in turn requires finding the beginning of the relevant stack frame.

The collector 102 summarizes 202 a pointer present in stack frame 110A and attempts to place this summary into the summary data structure 112 using an atomic insertion operation. An atomic insertion operation may be implemented by, but is not limited to, a compare-and-swap, double compare-and-swap, load-linked/store-conditional pair of instructions. These atomic insertion operations are described in more detail below.

The stack 110 may be concurrently scanned and the pointer present in 110A may be concurrently summarized by the mutator 104. This summary of the pointer in the stack frame 206 is then inserted into the summary data structure 112 using an atomic insertion operation. The use of the atomic insertion operation enforces the integrity of the data in the summary data structure even during concurrent operations. The mutator and collector may concurrently attempt to insert summaries into the summary data structure. The atomic insertion operations fail when a summary of the current stack frame has already been inserted into the summary data structure by the other agent, i.e., the mutator or the collector.

The stack scan only requires the mutator 104 to stop for short periods of time during the scan of a single stack frame, e.g. frame 110A. Because the size of a stack frame 110A is known at compile time, the amount of time required to scan the stack frame is bounded and predictable. When the mutator needs to use or modify a stack frame, the mutator first performs the scan and summarization of the stack frame if it is unscanned by the garbage collector. Stack scanning may be performed either by the collector or by the mutator.

When a mutator is running unmanaged code (e.g., performing some system call), the collector is allowed to acknowledge a handshake on the mutator's behalf and may immediately start to scan the stack for the mutator. In that instance, the mutator 104 cooperates upon returning to the managed code. However, the mutator 104 is not blocked until the collector finishes the stack scanning.

The stack summary of each stack frame is added only once to the summary data structure 112. Eventually the summary data structure 112 contains a list of all pointers on the stack snapshot and it may be used by the collector as roots for a marking phase of garbage collection.

The summary data structure 112 may be utilized by system 100 to achieve lock-freedom and even wait-freedom for the mutator, as the mutator 104 need not stop to wait for the collector to complete. Thus, this method may be used with collectors that support lock-freedom.

Two issues arise from implementing lock-freedom. First, the collector and the mutator 104 thread may concurrently update the summary data structure 112. In this case, consistency and uniqueness of the summary data structure must be preserved. Second, the collector may scan an outdated stack frame while the mutator is changing the stack content. This may occur when the mutator has already scanned that stack frame, but the collector has not yet noticed this fact. These are discussed in more detail below.

A write barrier may be used in many situations, including when the program performs a write via indirection through a pointer reference. Some programming languages permit a reference to point to a location on the stack, which in turn points to some heap object. One stack frame may thus point to a memory location in another stack frame. Languages that support passing parameters by reference (including C# or C++) generally support intra-stack references.

Figure 3:
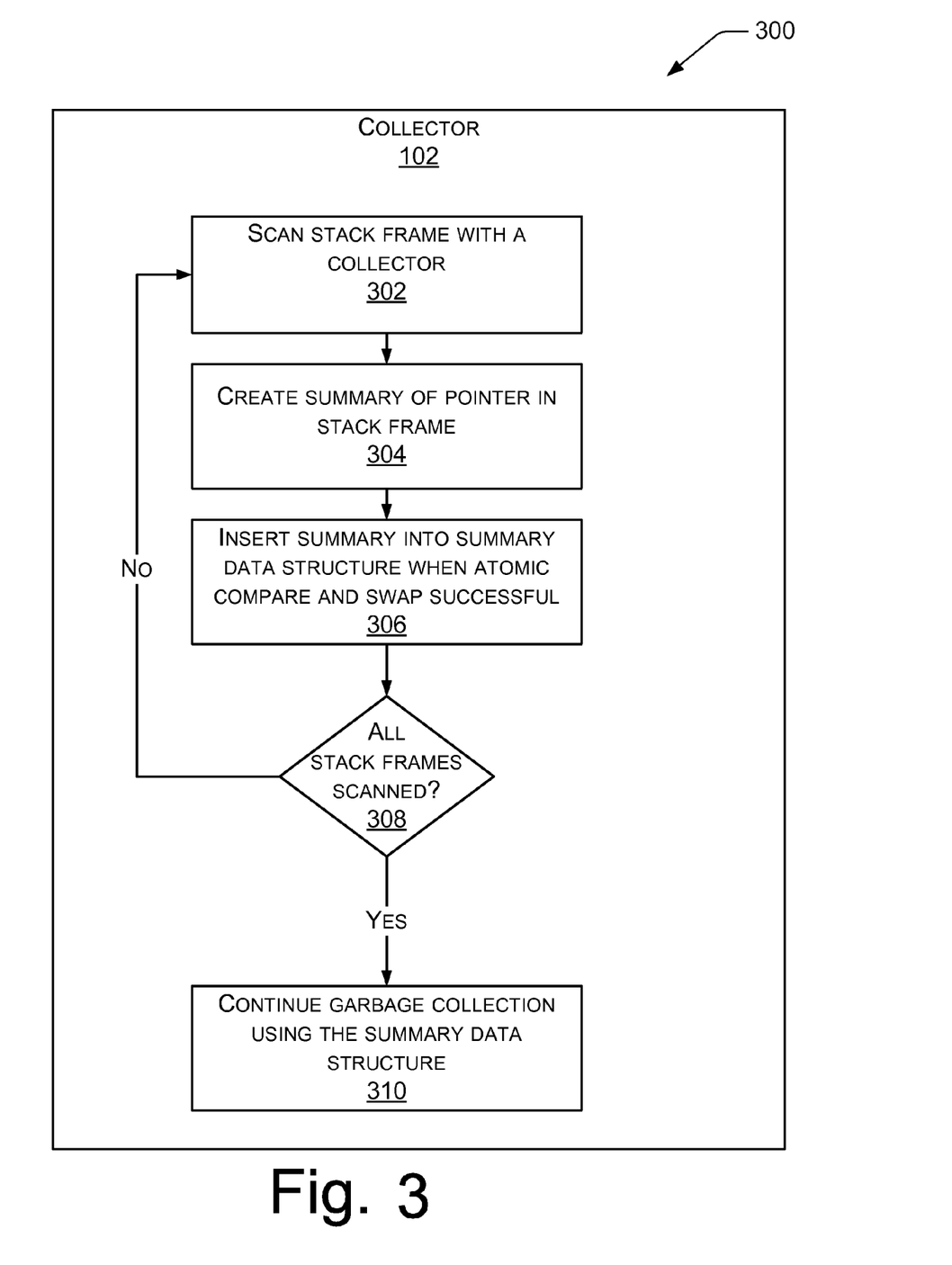
FIG. 3 is a flow diagram of the stack scan by the garbage collector.

FIG. 3 is a flow diagram 300 of the stack scan by the garbage collector. A stack frame is scanned with a garbage collector 302. A summary of the pointer present in the stack frame is created 304. An atomic compare and swap is used to maintain that information in the summary data structure is current and accurate, and prevent garbage data from overwriting valid data. When an atomic compare and swap is successful the summary is inserted 306 into a summary data structure. When the atomic compare and swap is unsuccessful, no data is inserted. When all stack frames have been scanned 308 garbage collection may continue 310, using the summary data structure. When all stack frames have not been scanned 308, the next stack frame is scanned with a collector 302.

Figure 4:
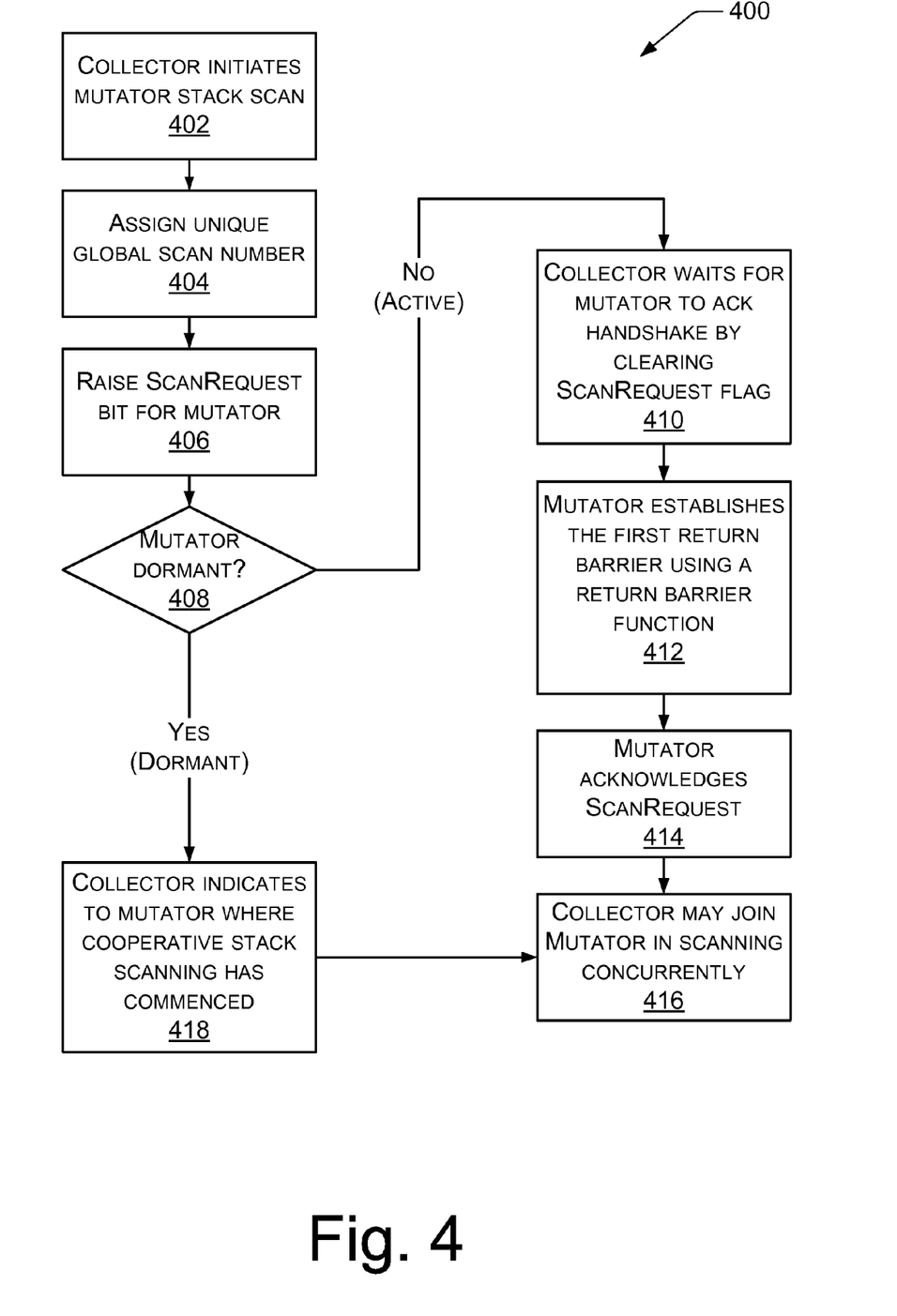
FIG. 4 is a flow diagram of the collector initiating a stack scan.

FIG. 4 is a flow diagram 400 of the collector coordinating with the mutator to establish where to commence a stack scan. At 402, a collector initiates a scan of the mutator stack.

At 404, the collector thread assigns a unique global scan identifier. The unique global scan identifier aids in maintaining consistency of the summary data structure. Because it is possible that a mutator thread may return from a dormant state after several rounds of garbage collection have executed, the global scan identifier is useful in these situations.

At 406, the collector raises a ScanRequest bit for each mutator. Each mutator thread is then processed, as described later in more detail. Multiple mutator threads may also be processed simultaneously.

At 408 a determination is made from the perspective of the garbage collector as to the status of the mutator thread. This determination is whether the mutator thread is dormant or active. A mutator thread is in a dormant state when executing in the unmanaged space. A mutator thread is in an active state when executing code of a managed language.

The compiler may be configured to allow adding code to the places of state transition so collector related code can execute when the mutator thread becomes dormant or when it returns to executing managed code. These functions are denoted GoToUnmanagedSpace( ) and ReturnToManagedSpace( ).

At 410, the situation for active (managed) code is addressed. The collector waits for the mutator to acknowledge the handshake. The handshake is acknowledged by clearing the ScanRequest flag which was raised earlier in 406. This wait provides an opportunity to synchronize the collector with the mutator prior to initiating a concurrent scan.

At 412, the mutator establishes the first return barrier using the return barrier function, described below in more detail. A return barrier is code that logically is executed upon return from a method. One implementation of a return barrier uses code upon every method return to test if there is work to do. Another implementation changes the return address found in the stack to only execute the test code when it cannot otherwise be determined that there is nothing to do, which avoids adding a test to all method exists. The return barrier that modifies the return address on the stack adds no overhead to the execution except when scanning of the next stack frame may be required. Usually, the collector will perform most of the scanning work and the mutator thread will hardly see any execution overhead. The mutator thread will only need to perform scanning work in the case that the collector is not fast enough to have scanned the stack frame prior to the mutator thread needing to access the stack frame.

At 414, once the mutator has completed establishing the first return barrier, the mutator acknowledges the ScanRequest.

At 416, the collector may then concurrently join in scanning the stack.

Returning to 408, when the mutator is determined 408 to be dormant, the collector may join the mutator in scanning concurrently 416. Given the nature of dormant (unmanaged) code, the mutator is not modifying the managed stack frames at this time. Threads that are currently executing unmanaged code do not need to acknowledge the ScanRequest bit request while executing unmanaged code, although they must still do so upon returning to executing managed code. For a dormant mutator thread, the point at which stack scanning is to commence is the transition on the stack between stack frames for managed code and stack frames for unmanaged code. Special care is necessary to ensure that when a mutator thread returns from executing unmanaged code to executing managed code, the mutator thread participates properly in the cooperative stack scanning. The collector may indicate to the mutator where the cooperative stack scanning has commenced 418. Subsequently, the collector may immediately begin scanning the mutator's stack. When a mutator thread returns from executing the unmanaged code, the ReturnToManagedCode( ) method ensures that the mutator thread participates properly in the cooperative stack scanning. Managed languages like C# or Java have no inter-thread races at this point. Each thread uses its own local stack that no other thread may modify. Thus, only the interaction of one mutator thread with the collector thread is applicable here.

Figure 5:
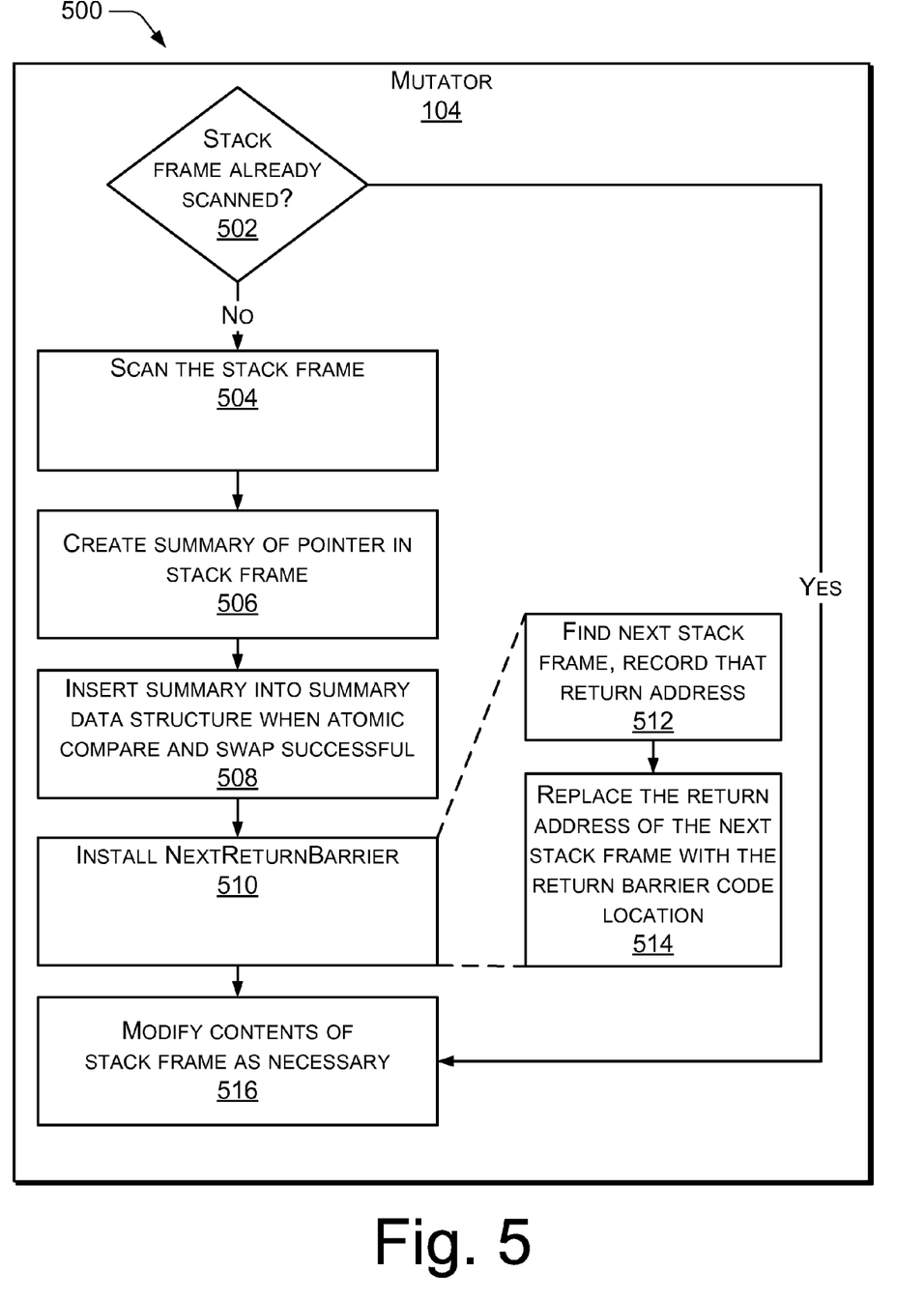
FIG. 5 is a flow diagram of the mutator scanning a stack frame.

FIG. 5 is a flow diagram 500 of the mutator scanning a stack frame, from the perspective of the mutator. As described above, the return barrier process may be used when the mutator is active, as when managed code is being executed. The return address resides in a memory location in the mutator's call stack and only the mutator may modify this location. The return barrier ensures that a summary of the contents of a stack frame has been created before the mutator returns to the method corresponding to the stack frame, which in turn means before the mutator starts modifying and possibly invalidating the contents of the stack frame.

At 502, the mutator 104 determines if the current stack frame has already been scanned. Because the return barrier is used when managed code is being executed, it is possible for the frame to have been previously scanned by the collector or by the mutator thread itself.

Given the extension that handles pointers from one stack frame into an older stack frame, the older stack frame is scanned at the same time as the younger stack frame. This, in turn, means that the mutator itself may have scanned an older stack frame, and the return address modification mechanism may guard the older stack frame by a return barrier. In other words, the mutator thread itself may have scanned the current stack frame due to a pointer into the current stack frame.

At 504 the stack frame which is presumed to be unscanned is scanned by the mutator. Note that a benign data race may occur here. After the mutator 104 has performed the determination in 502, the collector may have started and finished the scan of the stack frame. Therefore, it may be better to say that the stack frame is presumed to be unscanned.

At 506, the scan in 504 is complete, and at 508 the mutator attempts to insert the stack frame summary into the call stack summary data structure. The mutator may not succeed in inserting the summary if the collector manages to insert a summary for the stack frame prior to the mutator's attempt to inset the summary. An atomic insert operation is used to ensure that if both the mutator and the collector attempt to insert the summary for a stack frame, only one of the insertion operations will succeed.

At 510, the next return barrier is installed. This installation comprises at least two steps. First, at 512, the next stack frame is found and its return address is recorded. Second, at 514, the return address of the next stack frame is replaced with the return barrier code location. The next return barrier is thus installed.

The return barrier is a mechanism for trapping a return from a specific method without adding a test code to the exit procedure of all methods. This mechanism overwrites the return address on the stack with the address of the return barrier code location, and saves the overwritten return address in a predefined location (e.g., in the thread object). For example, if method A calls method B, then the return address will be an address of an element of the code that implements A. This change does not affect any further execution, including entry to and exit of any method except an exit from the specific instance whose return address on the stack is replaced. When that instance finishes executing and returns, the control is automatically transferred to the return barrier code. At the end of the return barrier code, the saved return address is retrieved and used to return to the appropriate code location, which typically is the instruction that immediately follows the call. Thus, after executing the return barrier method, the program resumes at the original return address.

The return barrier mechanism is used to "trap" the mutator thread just before it is about to access a stack frame that existed in the stack when the snapshot was requested, but was not yet scanned. This implementation employs a single return barrier for any thread stack at any point in time.

The return barrier mechanism must also cope with exceptions. Since the collector expects to be given an atomic snapshot of the stack, when an exception is thrown, the stack from the throwing location to the catching location is scanned. This is achieved by inspecting each stack frame while unwinding the exception. If a return barrier is found, then it is executed as part of the exception unwinding code and a subsequent return barrier is placed at the next stack frame.

One alternative to using a return barrier is the insertion of conditional statements guarding the use of a stack frame prior to or after the return from a method call. The return barrier mechanism is superior in at least two respects: First, the return barrier allows dynamically enabling the trapping only when required. Second, the use of the return barrier in this method has minimal overhead because the method is executed by the mutator thread once for each stack frame that exists on the stack when the stack scanning request is made. It does not otherwise affect the execution. If a return barrier is placed on a specific stack frame, then until the execution returns from that method it can enter and leave any method without any overhead whatsoever. When exiting a method associated with the frame that has the return barrier, the barrier is moved to the next frame, thus each frame on the stack is associated with a single barrier execution.

ALGORITHM 1 shows exemplary pseudo code for one implementation of the return barrier function.

---

Algorithm 1

General structure of the return barrier function
return barrier function
    if the current stack frame has not yet been scanned
        Scan stack frame;

| Algorithm 1 |
|---|
| Insert summary record into the summary data structure;<br>// Place a return barrier on the next frame in the stack<br>InstallNextReturnBarrier( );<br>return to the previously saved address.<br>InstallNextReturnBarrier( )<br>   Find the next stack frame and record its return address;<br>   Replace the return address of that stack frame with the<br>   return barrier code location; |

Figure 6:
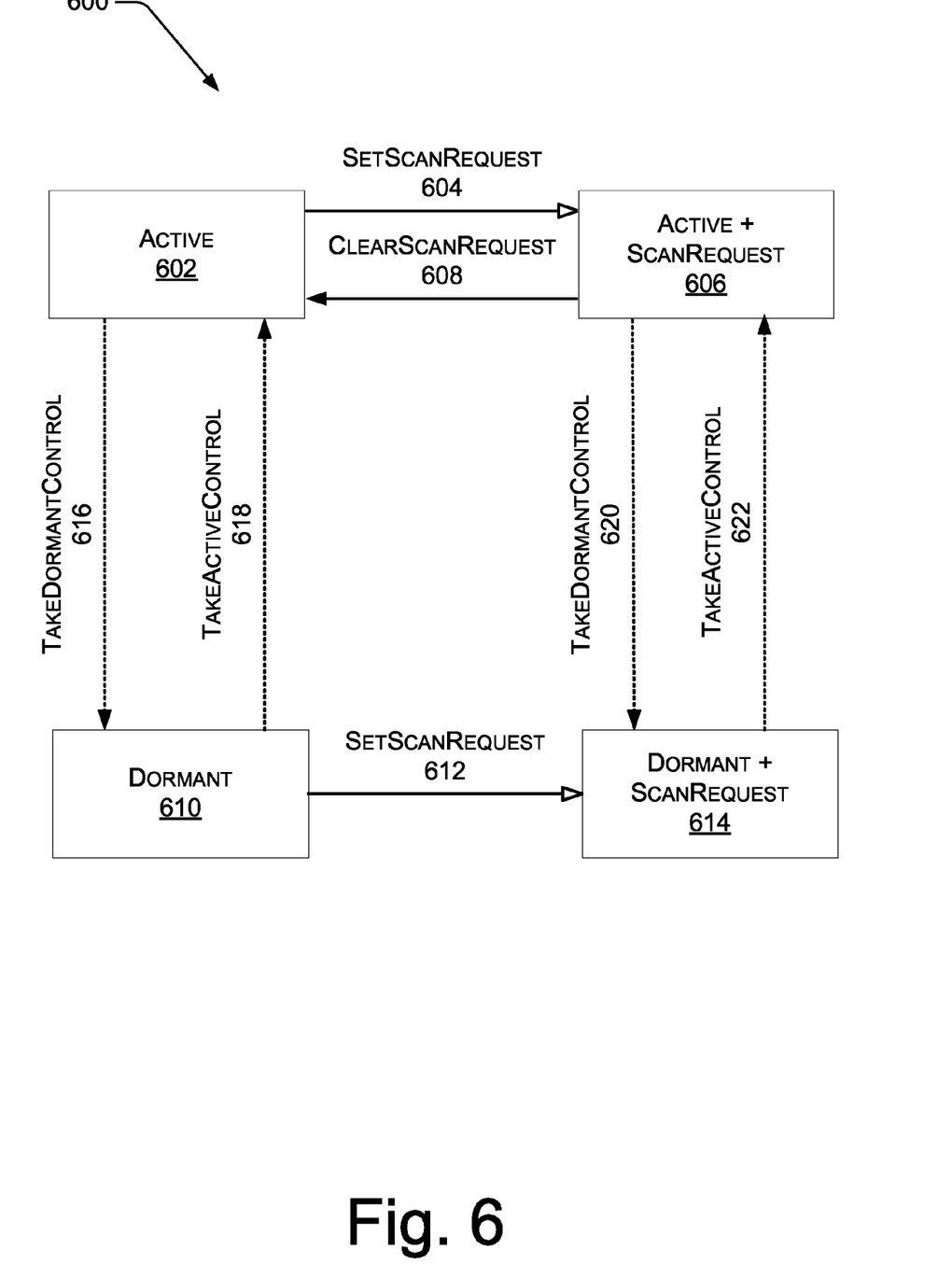
FIG. 6 is an illustration of four possible exemplary mutator states.

FIG. 6 is an illustration of four possible exemplary mutator states. At 600 four possible mutator states are depicted, though it is appreciated that more states are possible. The state of each mutator is stored in a thread-local variable State. The state may be inspected by the collector and/or the mutator. The state may be modified by an atomic instruction, such as CAS (or a similar) operation.

A mutator may be in an Active state 602 involving managed code, as described previously with regards to FIG. 3 and FIG. 5.

The mutator may initiate a SetScanRequest 604 and transition from Active state 602 to Active+ScanRequest state 606 where the mutator handling managed code is waiting for the requested scan. When the scan is complete, the ClearScanRequest 608 is made and the state transitions from Active+ScanRequest state 606 to Active state 602.

A mutator may be in a Dormant state 610 involving unmanaged code, as described previously with regards to FIG. 3 and FIG. 5. The mutator may initiate a SetScanRequest 612 and transition to Dormant+ScanRequest state 614 where the mutator is either inactive or executing unmanaged code and waiting for the requested scan.

A mutator may also transition from Active state 602 to Dormant state 610 using TakeDormantControl( ) 616. Similarly, the mutator may use TakeActiveControl( ) 618 to transition from Dormant state 610 to Active state 602. Likewise, when a ScanRequest has been made, the state may shift between Active+ScanRequest state 606 and Dormant+ScanRequest state 614 via TakeDormantControl 620 or back via TakeActiveControl 622

When a scan request has been set in either state 606 or state 614, the collector initiates the stack scan by invoking CollectorStackScan( ).

ALGORITHM 2 below is exemplary pseudo-code for the CollectorStackScan( ) function.

| Algorithm 2 |
|---|
| Initiating a Scan<br>CollectorStackScan( )<br>  scanNumber++<br>  for each mutator i do<br>    SetScanRequest(i)<br>  for each mutator i do<br>    loop<br>      if InDormantState(i) then<br>        ScanStackByCollector(i, scanNumber);<br>        break<br>      else<br>        if HasScanRequest(i) then<br>        Wait(some-time);<br>        else<br>          // Mutator already started scanning - join it<br>          ScanStackByCollector(i, scanNumber);<br>          Break<br>MutatorScanResponse( )<br>  if HasScanRequest(currentThread) then |

| Algorithm 2 |
|---|
|     currentThread.InitiateMutatorStackScan(scanNumber);<br>    ClearScanRequest(currentThread); |

As can be appreciated from Algorithm 2, a unique global scan number is assigned to a scan process. This number is required for consistency of the Summary data structure because a mutator thread may return from a dormant state after several collections have been executed and the mutator should only modify the Summary Data Structure for the latest stack scan. The collector then raises a ScanRequest bit for each mutator. If the mutator is not Dormant (i.e., it is running managed code), then the collector waits for the mutator to acknowledge the handshake by clearing the ScanRequest flag and then the collector starts scanning its stack concurrently.

The collector waits for the mutator to respond because the mutator may be modifying the stack continuously while executing managed code. Thus, some sort of synchronization must be set up before the concurrent scan can begin. In particular, the collector and the mutator must agree on the point in time in which the snapshot is taken. This is done by letting the mutator fix the first return barrier and record initiation information in the Summary data structure. Only then, the mutator acknowledges the ScanRequest and lets the collector join the scanning concurrently.

When the mutator is dormant, the collector immediately proceeds to scan the mutator's stack. This may be done because the mutator is not modifying the managed stack frames at this time. Care is required to coordinate the return of the mutator from the dormant space. In order to provide information required for the scan, the mutator records the current stack pointer before going into an unmanaged code. Upon returning from the unmanaged space and noticing the scan request bit set, the mutator starts cooperating with the regular stack scanning protocol described below.

When the mutator is dormant, the collector is able to finish scanning its stack and exit the CollectorStackScan( ) method without ever waiting for the mutator.

When a mutator thread is active and notices that the ScanRequest bit is set, the mutator calls the MutatorScanReponse( ) method. Stack scanning is then initiated and the ScanRequest flag is cleared.

Before a mutator thread invokes any unmanaged function call, it invokes the GoToUnManagedSpace( ) method, which records the stack pointer in a thread local variable stackpointers and switches into a Dormant state. Upon returning to the managed space, the mutator invokes the ReturnToManagedSpace( ) method. The mutator first switches to the Managed state and then if it has a ScanRequest it initializes the scanning and acknowledges the ScanRequest by calling the MutatorScanResponse method.

A simple optimization may be used when the collector finishes scanning the entire stack while there is still a pending ScanRequest for the mutator. In this case, there is no need for the mutator to perform any stack scanning work. Therefore, the collector could clear the ScanRequest bit, if the mutator is still dormant. This is done with a CAS operation to avoid races. It should be noted that the method also works without clearing this flag. In particular, this optimization cannot be used with moving collectors that are discussed below. For such collectors, the mutator must be aware and take action for each stack scan, even if it does not participate in the actual scan at all.

The above handshake mechanism guarantees that the thread is either in a Dormant state or executes the InitiateMutatorStackScan( ) with the latest scanNumber. The collector thread will execute the ScanStackByCollector( ) method for every mutator call stack. Notice that the mutator may even skip a number of scan cycles. The ability of the collector to make progress does not depend on the mutator in this case, since the collector may finish the stack scanning itself and proceed to reclaiming garbage. This also does not violate any safety property with regard to the running application, as the mutator takes care to not foil the scan upon returning to the managed space.

ALGORITHM 3 is an example of pseudo-code for unmanaged space support.

Algorithm 3

Unmanaged space support
GoToUnManagedSpace( )
   stackPointers[currentThread] = Current Stack Pointer;
   TakeDormantControl(currentThread);
ReturnToManagedSpace( )
   TakeActiveControl(currentThread);
   if HasScanRequest(currentThread) then
     currentThread.InitiateMutatorStackScan(scanNumber);
   ClearScanRequest(currentThread);

Since both the collector and the mutator thread may potentially scan the same stack frame concurrently, synchronization is accomplished via the Summary data structure data structure, which is now described.

For simplicity, stack frames are discussed, but the scanned segments in the stack may vary. These segments may be larger, smaller, or may contain more than one stack frame. A priority setter may be used to alter the stack fragment size to attain a specified level of responsiveness.

One implementation is to scan one frame at a time when responsiveness is a top priority. The Summary data structure is a designated data structure used to maintain records of the stack frames that have been scanned. It holds a stack-frame record for every frame of the stack, denoted FrameRecord, which comprises a set of pointers. The FrameRecord also holds a next pointer pointing to the next FrameRecord in the chain and a StackPointer pointing to the end of the frame corresponding to this FrameRecord.

The object addresses recorded in the Frame Record are part of the root set of pointers that need to be traced by a mark-sweep collector or modified by a moving collector. There is one summary data structure per mutator stack and it is being updated cooperatively and concurrently by its corresponding mutator and the collector thread. The update is lock-free, i.e., one of the two threads is bound to make progress within a bounded number of steps. The update is also wait-free, i.e., within a bounded number of steps by either thread the update will have happened, either due to the thread itself or due to another thread.

The summary data structure data structure may be implemented as a linked list of frame records with a header pointer named head that always points to a first dummy empty record. The next pointer is used to link the list and the records are stored in a chronological order, so that new records are added to the tail. The StackPointer points to the end of the frame of the corresponding FrameRecord and it allows the collector to find where the next stack frame starts in the case it needs to skip a number of frames (due to the frames having already been scanned by the mutator).

Figure 7:
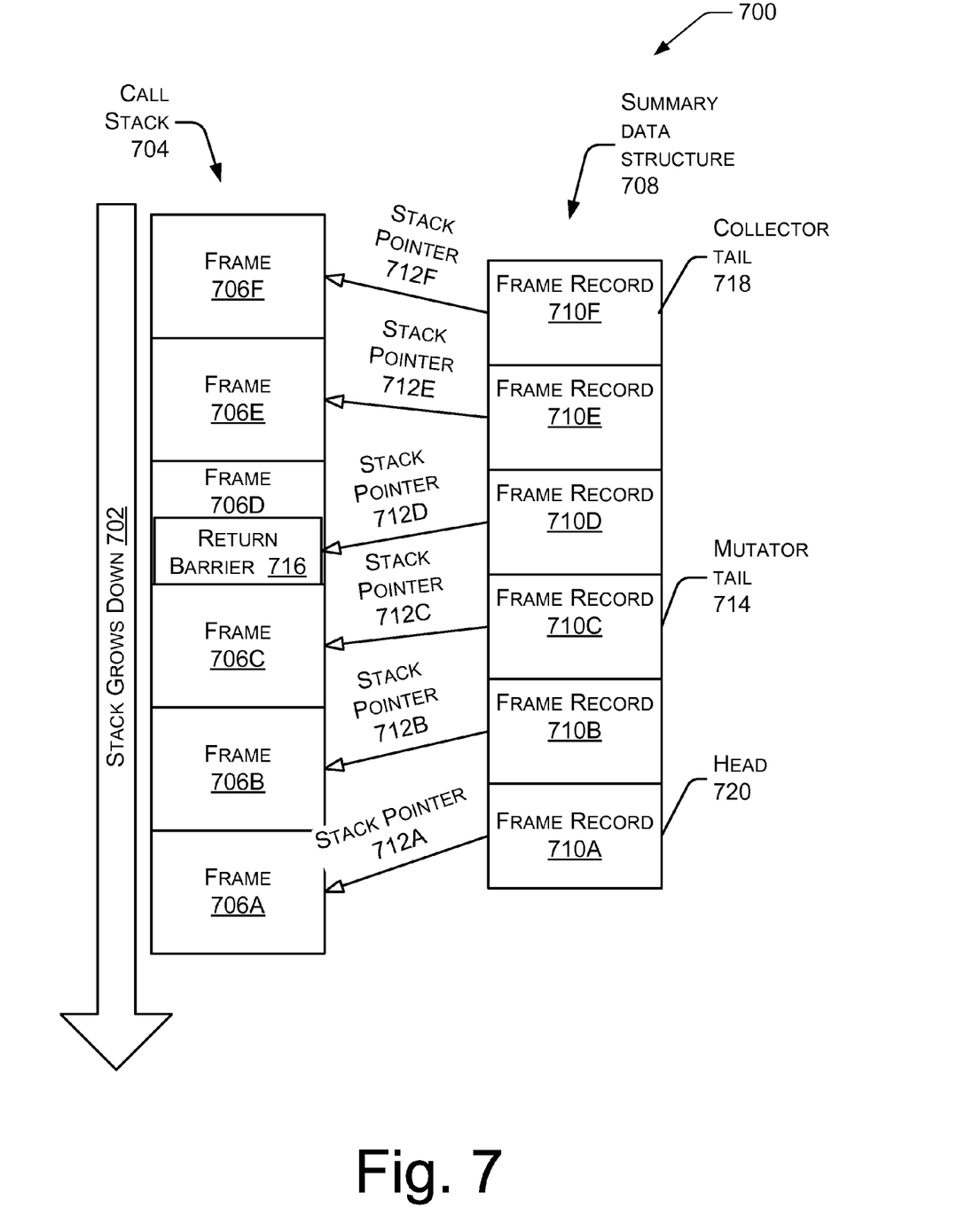
FIG. 7 is an exemplary call stack and associated summary data structure.

FIG. 7 depicts an example of a call stack and a corresponding summary data structure in more detail. Note the stack in this figure is assumed to grow down 702.

A call stack 704 structure is shown, with frames 706A-F within indicated.

Summary data structure 708 is shown, with frame records 710A-F within defined. These frame records store mutator and collector scan results after a successful atomic insertion operation.

Stack pointers 712A-F are illustrated between entries in the Summary data structure 708 and the call stack 706. These stack pointers extend from Frame Records 710A-F to their respective stack frames 706A-F.

For illustrative purposes, assume that the mutator has already exited stack frames 706A-C. The return barrier 716 is guarding the access to the next stack frame, 706D. Because of the return barrier 716, the mutator's view of the frame record list tail 714 at least ensures that the frame record list includes a pointer to frame record 710C which refers via stack pointer 712C to frame 706C. The return barrier guards the access to 706D in case that stack frame has not yet been scanned. The mutator knows that 706A-C have been scanned, thus in the worst case the mutator's view of the frame record list is that 706C is the tail.

For illustrative purposes, it may be assumed that the collector has already scanned stack frames 706A-E and created Frame Records 710A-E in the Summary data structure. The collector's view of the frame record list tail 718 now points to frame record 710F.

The head of the Summary data structure list may also be designated 720. Use of a head, mutator tail, and collector tail, such as the head 720, the mutator tail 714, and the collector tail 718, are described next.

As described in ALGORITHM 2, the mutator starts a new stack scan by invoking the InitiateMutatorStackScan( ) method, pseudo code for which is shown in ALGORITHM 4.

Algorithm 4

InitiateMutatorStackScan(int scanNumber)
   InitiateHeader(scanNumber, stackPointers[currentThread]);
   mutatorTail = head;
   Eliminate the return barrier from the previous scanning cycle;
   InstallNextReturnBarrier( );

This procedure starts by invoking InitiateHeader( ) on the Summary data structure. The code for InitiateHeader( ) appears in ALGORITHM 5.

Algorithm 5

InitiateHeader(int scanNumber, int* startAddr)
   tmp = head;
   if tmp.number ≠ scanNumber then
     newHead = new FrameRecord(scanNumber, startAddr);
     CAS(&head, newHead, tmp);

Note that this implementation starts by saving the pointer to the head frame record locally (in tmp). This allows testing the number on the same head record which the CAS operation later uses as its comparand value.

After initiating the header, the mutator installs a new return barrier. Every subsequent stack scan and Summary data structure update by the mutator will be performed from within the return barrier method. Thus, the mutator scans the stack incrementally.

Meanwhile, the collector executes the ScanStackByCollector( ) method. It starts by calling InitiateHeader( ) on the Summary data structure as well, and then scans the whole stack, updating the Summary data structure with each frame record that has not been previously installed by the mutator.

The main synchronization point happens when the mutator or the collector is done with creating a frame record and they are trying to install it into the summary data structure.

Consider first the mutator actions described above in FIG. 5. A new stack scan is started by invoking the InitiateHeader( ) method, in which a new head is being initialized, implying a new summary data structure for this scan. The scan is assigned a unique scan number and the location of the first frame (from which the scan should start) is recorded. A CAS is used to make sure that only one header is installed for the scan.

Before scanning the next stack frame in the return barrier function as shown in ALGORITHM 6 below, the mutator checks if the stack frame has already been scanned by the collector. If not, the mutator scans the next stack frame and attempts to add a new FrameRecord to the mutator's tail by applying a CAS operation on the mutatorTail.next pointer. Failing the CAS means that the collector has already installed the frame record and the mutator may use the frame record without further action. The ScanFrame( )method scans the next stack frame according to the compiler-generated stack maps and records the list of encountered pointers in the FrameRecord structure.

---
Algorithm 6
---

```
return barrier function
if mutatorTail.next = NULL then
   // The current stack frame has not been scanned yet
   FrameRecord record = ScanFrame(mutatorTail.addr);
   CAS(&mutatorTail.next, record, NULL);
mutatorTail = mutatorTail.next;
ApplyRecord(mutatorTail, FALSE);
// Move the return barrier one frame up the stack;
InstallNextReturnBarrier( );
return to the previously saved address.
```

Next, the mutator updates its mutatorTail and installs new return barrier. The collector follows a similar procedure, i.e., initiating a header and then attempting to scan each unscanned frame and add it to the summary data structure. The main difference is that the collector executes this procedure in a loop rather than via a return barrier.

If the mutator was faster and the collector needs to skip some number of already scanned frames, the collector may find the beginning of the last unscanned frame from the Stack-Pointer recorded in the last FrameRecord.

The collector also "applies" the records, i.e., handles the obtained pointers to aid the collection. Normally, this means marking the referenced objects and tracing their descendants.

The races of initiating the header and installing new frame records have been handled by CAS instructions as describe above. One additional race to handle occurs when the collector is scanning a frame that the mutator has finished scanning and has started to modify.

In its simplest form this means that the mutator modifies the same stack frame that is currently being scanned by the collector. This may result in the collector reading values from the stack frame that are different from the values found in the stack frame at the time the stack scan was initiated. In a more elaborate form, this race may happen when the mutator has popped the frame on which the collector is working and has pushed new different frames. This could result both in the collector's reading wrong values, and the collector's misinterpreting frame boundaries.

The above races occur when the mutator has started modifying the frame. The mutator only starts modifying the stack frame after it has finished scanning that frame and has already inserted a frame record into the summary data structure. It follows that whenever such a race happens, the collector will not be able to insert its frame record into the summary data structure. When it attempts to do so, the CAS fails because the mutator has already inserted the record that corresponds to that frame.

Thus, the concern is not what the collector outputs in its frame record, but rather that the collector will finish in a reasonable bounded time so that it can continue its work.

In the simple case in which the frame values change, the collector may find unexpected values because the compiler stack maps depend on the execution location in the code. For example, it may expect a pointer field, but find a non-aligned address. When the collector encounters an unexpected value on the stack that does not match the compiler's stack map, it aborts the scanning of the current frame and moves on to scanning another frame.

The more complicated case occurs when the mutator has already popped the scanned frame (and maybe popped and pushed a number of additional stack frames). Some of these frames could belong either to the managed or the unmanaged code (e.g., system calls).

To deal with this, the boundaries of the frame are determined in the beginning and checked for internal consistency. Therefore, the scan must terminate. Upon detecting an unexpected value, the collector skips all the popped and the new frames and continues scanning from the first frame that was not yet scanned by the mutator. This is achieved by the collector following the collectorTail.next pointer to the last FrameRecord in the Summary data structure and using the address recorded in this last FrameRecord as an address of the next stack frame as described in ALGORITHM 7.

---
Algorithm 7
---

```
ScanStackByCollector(int threadId, int scanNum)
InitiateHeader(scanNum, stackPointers[threadId]);
collectorTail = head;
while collectorTail.addr != end of the stack
   if collectorTail.next = NULL then
      FrameRecord record = ScanFrame(collectorTail.addr);
      CAS(&collectorTail.next, record, NULL);
   collectorTail = collectorTail.next;
   ApplyRecord(collectorTail, TRUE);
```

To prevent additional races, a strong invariant is maintained in which only the mutator modifies the stack. The collector can only read it, but never modify it. This may be implemented by using a limiter which prevents the collector from modifying the stack and permits only the mutator to modify the stack.

At least two optimizations may be applied to the above described methods. First, the return barrier lets the mutator move the barrier one frame up at a time. However, if the collector has already scanned some frames, then the barrier may move farther up. The mutator does not need to scan or install the return barrier for the frames already scanned by the collector. The mutator follows the mutatorTail.next pointer while it is not NULL (in the return barrier method in ALGORITHM 6) and installs the return barrier only for that frame, which is the frame immediately following the last frame scanned by the collector. This may be implemented by an accelerator which moves the return barrier to reflect the last fragment scanned by the collector.

Another optimization relieves the collector from performing some work. The collector need not rescan stack frames that were not modified by the mutator since the last collection cycle. To allow this optimization the FrameRecords from the previous collection cycle are retained and also maintain a watermark of the last, top-most stack frame modified by the mutator. Such a watermark could be maintained via a similar return barrier mechanism. For programming languages that support reference parameters (including C#), maintaining such a watermark is more complicated and may require a usage of write barrier on the indirect-reference accesses.

In languages that support passing parameters by reference (like C# or C++), a reference on the stack may point to a different location on the stack, which in turn points to some heap object. Such a reference is denoted an "intra-stack reference."

Figure 8:
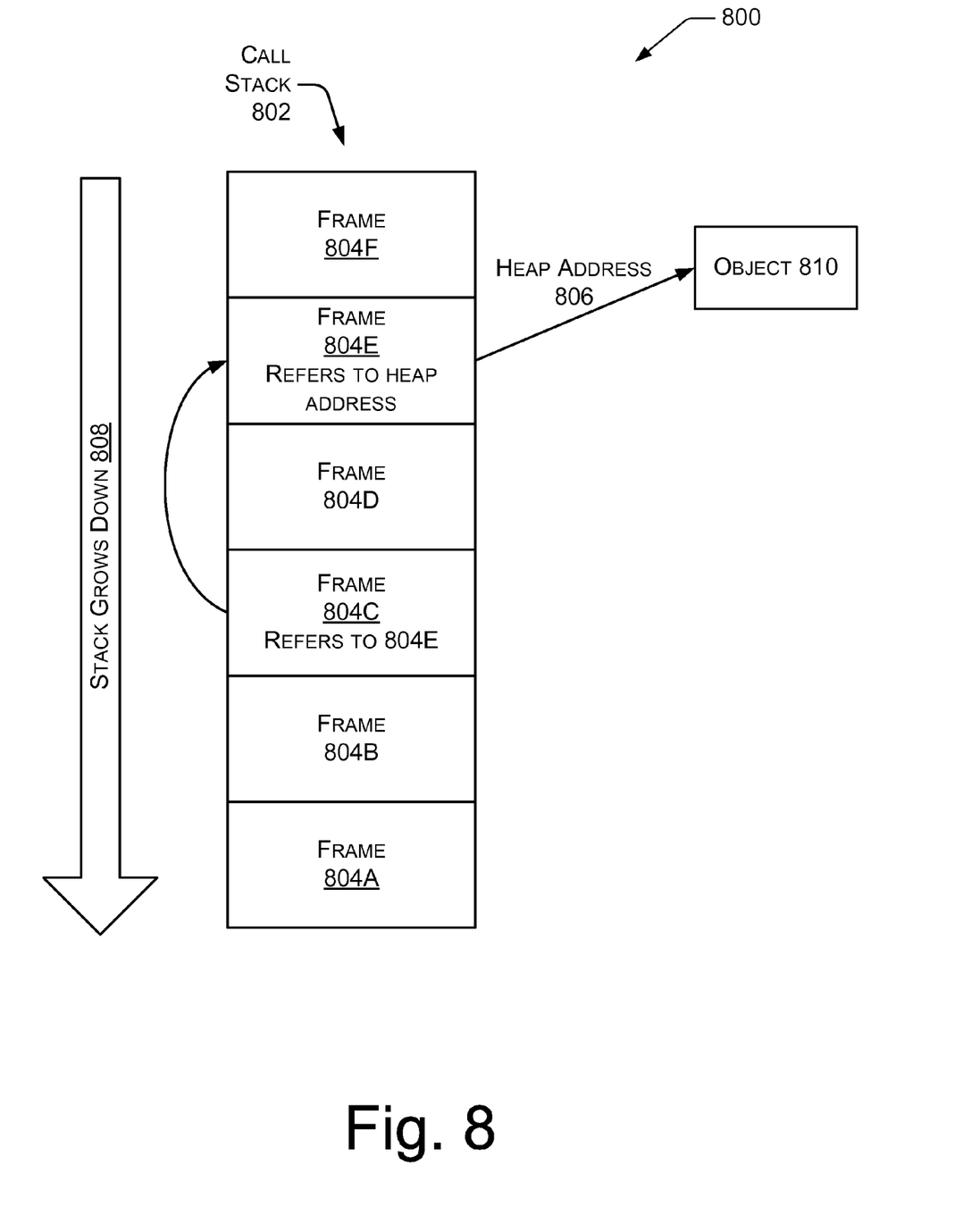
FIG. 8 is an example of an intra-stack reference.

FIG. 8 is an example of such an intra-stack reference. A call stack 802 comprised of stack frames 804A-F is depicted. Stack frame 804C contains a reference to stack frame 804E which is elsewhere in the stack. In turn, 804E contains a reference to heap address 806. In this example, the stack grows down 808.

If no special care is taken to account for intra-stack references, the previously described method could fail to provide a snapshot of the stack of a thread. This is because the mutator only scans the most recent frame, but may change older frames using intra-stack pointers. If the mutator changes pointers before scanning those frames, the snapshot property of the scan may be violated and also violate the collector's safety guarantees.

To solve this problem, a write barrier on indirect stack access is used. One implementation is to modify the behavior of a special Microsoft Intermediate Language (MSIL) instruction that executes an indirect access. The barrier is activated by the collector when it raises the ScanRequest flag and may be deactivated for each mutator after the collector has finished scanning its stack. The barrier records the old value of the modified location, thus allowing the recording of the values in a true snapshot of the stack.

The barrier is used only during the stack scanning period and only on indirect stack accesses, i.e., on frames that are not the current one. Thus, the barrier is seldom used in practice, and imposes negligible overhead. In addition, some concurrent garbage collectors already employ such a write barrier during the scanning phase of garbage collection, in which case the "addition" of the write barrier for stack scanning purposes will not add any overhead.

Moving garbage collectors require special considerations. Moving garbage collectors include handle moving collectors, compacting collectors and copying collectors. Moving garbage collectors move objects and update pointers on the stack while scanning and so require another implementation of the method described above.

An assumption is made that for each pointer in the stack it is possible to take the appropriate action when it is scanned. For some pointers no action is required, and for others an update of the pointer by an updater (and maybe a move of the referent) is required, and then the information on how to update the pointer is available from the collector (e.g., by a forwarding pointer). The stack scanning must make sure that before any pointer is accessed by the mutator, the appropriate operation is applied on it. For example, if an object has moved, then a stack scan may be required to update all pointers on the stack to the object. The incremental scan may then update all pointers before the mutator accesses any of them.

When objects are relocated, for example when using a copying garbage collector, the ApplyRecord( ) may be used to update pointer values. ALGORITHM 8 shows pseudo-code for the ApplyRecord method when using a non-copying garbage collector.

---
Algorithm 8
---
ApplyRecord(FrameRecord record, isCollector)
   if isCollector then
      mark and trace addresses in the record;
---

Assuming some mechanism for determining the new locations of the objects, such as a forwarding pointer, updating the record to reflect the new locations may be done when the stack pointers are recorded.

Moving garbage collectors may be accommodated by the method described above. Such accommodation is made by modifying the scanner that scans the stack frames (the ScanFrame( ) method) and the method using pointers discovered on the stack frame (the ApplyRecord( ) method). The necessary accommodations are now described.

The FrameRecord now holds, in addition to the next and StackPointer fields, a variable length linked list of triplets. Each triplet stores an old pointer value, a new pointer value and the location on the stack of this pointer.

ALGORITHM 9 shows exemplary pseudo code for the ScanFrame( ) method used with a moving collector using forwarding pointers and implementing lazy updates. The collector or the mutator records a triplet in the FrameRecord for every location that stores a pointer.

---
Algorithm 9
---
Moving Collector with Lazy updates
FrameRecord ScanFrame(int* addr)
   FrameRecord prev = getPrevCycleRecord(addr);
   if prev.wasApplied( ) then
      scan the stack, follow forwarding pointers if necessary,
      and record addresses and their stack-location in curr;
   else
      scan the addresses in prev, follow forwarding pointers if necessary,
      and record addresses and their stack-location in curr;
   return curr;
ApplyRecord(FrameRecord record, bool isCollector)
   if isCollector then
      mark and trace addresses in the record;
   else // Mutator execution
      if !record.wasApplied( ) then
      update the stack with addresses in the record;
      record.setApplied( );
---

A convention is specified in which only the mutator applies the necessary actions to the stack, according to the frame-record. This prevents races, but also requires care about the mutator's handling a frame after the collection has already terminated. Several collections may terminate before a frame record is actually handled by the mutator, and the object originally pointed to by a stack slot may have been relocated multiple times by then. This is why information on the updated object address should be recorded for future use.

After the FrameRecord is created (either by the collector or by the mutator) and before the mutator accesses this stack frame, the mutator updates the addresses in this frame with the new to-space addresses recorded in the FrameRecord, as described in the ApplyRecord( ) method in ALGORITHM 9.

Since the stack is updated in a lazy manner, as long as the mutator has not reached and updated a certain stack frame, it may still hold the old outdated addresses. This holds even when the collector has finished scanning the stack and even when it has finished updating the heap and has released the old copies of the objects. As a result the stack may temporarily hold some old outdated addresses of the objects that were already relocated and released. Thus, the FrameRecords in the Summary data structure (which hold the new to-space addresses) must be retained as long as the mutator has not reached and updated their corresponding frames. In addition, since the mutator needs to update every stack frame, the optimization of the mutator skipping a number of return barriers suggested above for marking collectors is not possible for moving collectors.

A complication due to the lazy updates arises in the way the next stack scanning cycle should be performed (both for marking and for updating). As explained above, the stack may temporarily hold addresses of relocated copies of some objects. Neither the collector nor the mutator may use the content of a frame that was not updated yet to find roots for scanning.

An example based on the stack depicted in FIG. 8 demonstrates this. Suppose a previous scanning cycle, in which some objects were moved, has finished, but the mutator has only reached and updated the stack frame number 804D. Thus, all the stack frames above number 804D were not updated yet. When a next scanning cycle starts, both the collector and the mutator will start a new scan from the youngest stack frame at the time (the mutator by canceling an old return barrier and installing a new one).

When both the collector and the mutator scan the frames younger than 804E, they may use the pointers recorded on the stack itself. However, starting from frame number 804E and above, the collector and the mutator cannot use the pointers recorded on the stack, since ApplyRecord has not yet been applied for these frames and they may now point to different objects that have been relocated.

This is the main reason why the new location of a moved object is recorded in the frame-record. The relevant pointers of the stack frame are deduced from the FrameRecords of the previous cycle Summary data structure. The details are depicted in the updated version of methods ScanFrame( ) and ApplyRecord( ) in ALGORITHM 9.

Both the collector and the mutator use a previous cycle Summary data structure in conjunction with the heap while scanning the stack as part of the current scanning cycle. The action depends on whether the stack frame has already been updated or not. Therefore, after the mutator updates every frame, it marks the corresponding FrameRecord as applied.

During the scan, if the corresponding FrameRecord from the previous cycle was already applied (the stack was updated), the addresses may be deduced from the stack. Otherwise, they may be deduced from the previous cycle's FrameRecord. If pointer updates are required in this cycle, the new to-space address is also deduced by following the forwarding pointer.

The modifications required to accommodate lazy stack updating could be resolved by not performing the updates lazily. The mutator could update the stack incrementally to make sure that the stack updates are executed prior to the beginning of the next collection. This would require a work-based collector scheduling, which may in turn lead to low mutator utilization at some time intervals during the collection.

Complications may arise when dealing with moving collectors in the presence of C#-style intra-stack references. In this case only collectors that use object forwarding pointers and follow an eager-update policy are addressed. These collectors update each stale pointer they encounter before writing it to the stack. It is guaranteed that any pointer written to the stack after an object moves is an updated one. Thus, only pointer references found in old stack frames need to be updated.

Indirect stack-access write barriers are used as before and let the collector process pointers that are indirectly touched in older frames. Processing may include updating references, noticing a root pointer, or even copying the referent in a copying collector.

Special care must be taken with the write barriers for indirect stack references during the scanning period. A collection scheme may assume that after it scanned the stack, all pointers are updated and the mutators may use it without concern about moved objects. With this incremental stack processing scheme, only the most recent frame is updated, and thus an indirect pointer may see an outdated reference. For example, in the situation depicted in FIG. 8, when the mutator accesses object 810 at a heap address 806 via indirect reference at 804C, if the location 804E has not been updated yet, the mutator may access an old copy of object 810. The indirect access barrier alleviates this issue.

A frame that holds an intra-stack reference (reference into the stack) is denoted a "dependent frame" and a frame holding a referenced address as a "referenced frame." In FIG. 8, frame 804C is a dependent frame and frame 804E is a referenced frame.

One solution to dealing with intra-stack references is to update the referenced location when scanning the referring location itself, e.g., to update stack frame 804E when updating stack frame 804C. This may increase the work required for updating a stack frame, because for each slot there is (potentially) an additional (bounded) amount of work required to scan the referenced slot in the referenced frame. Even with this additional work, the amount of work is still bounded and predictable during compile time. In order to update a value in an arbitrary location on the stack one first needs to ensure that the ApplyRecord method has been applied to the FrameRecord for the frame containing the referenced slot. The issue remains as to what to do if the FrameRecord has not yet been created. Unfortunately, many modern compiler infrastructures do not support bounded time on-demand creation of the FrameRecord.

Modern compilers attempt to save and maintain only required information on stack. Therefore, an attempt to find frame boundaries, given a pointer to the middle of a frame is not always possible, and furthermore, without the starting address of a frame, it is not always possible to obtain the compiler stack map for that frame.

If the compiler does not support such an operation and cannot be easily modified to support it, then a more costly naive solution exists. This would involve traversing the stack from the dependant frame all the way up to the referenced frame to find its boundaries, locating its stack map and scanning that frame. However, this solution introduces the need to perform a theoretically unbounded amount of work and a potentially long pause time in practice.

The solution adopted in this application to solve these problems is performing two scans of the stack instead of just one, and creating a chaining of FrameRecords of the dependent frames during the stack scanning phase. This is now described.

A first scan is used to allow the collector to establish a snapshot of the stack and build a data structure that will help work with intra-stack references. A second scan updates the references to make sure they all point to the new locations of all moved objects. This scheme is limited to serving collectors that have an eager-update behavior. Eager-update collectors replace the pointer to the updated location of the object prior to storing the reference in a reference field, variable, or stack slot upon reading a pointer to a stale location of an object.

When scanning a frame which holds an intra-stack reference, such as frame 804C in FIG. 8, the FrameRecord is marked as a dependent and linked to all referenced frames' FrameRecords (described below). When the stack scanning is finished a check is done to determine if at least one dependent frame has been encountered. If at least one dependent frame has been encountered, a second stack scanning is performed, in which the FrameRecords of the referenced frames when scanning the dependent frames are also scanned. The Summary Data Structure from the first scan establishes the boundaries of stack frames that existed at the time of the first stack snapshot. The FrameRecord of any referenced frame that was scanned during the first scan may now be accessed via the linking constructed during the first scan. During the second scan, any referenced stack frames that did not exist during the first scan will only contain updated pointer values, which means that such referenced stack frames do not have to be scanned prior to being accessed.

The mutator does not have to wait for the collector at any stage. Before the collector finishes the first scan (at which point the boundaries map is ready), the mutator does not need to update the referenced frames. During this time, the mutator may perform indirect stack accesses by using the forwarding pointers installed in the old from space copies of the objects. This is safe because the collector starts reclaiming the old copies only after the second scan is over. The snapshot of the indirect stack accesses at this stage is taken just like in the marking collector from within the read barrier. After the first scan is over, the snapshot of the stack has been taken. However, the FrameRecord for a referenced frame may not accurately reflect the references appearing in the frame due to mutations via intra-stack pointers. The second scan ensures that all stack frames that may contain stale pointer values (references to objects that have moved) have accurate FrameRecords or ApplyRecord was called on an accurate FrameRecord prior to any use of the frame.

The linking of the dependent frames on the referenced frames is then performed in the following manner. When scanning a frame which holds an intra-stack reference, the FrameRecord (denote this FrameRecord as X, for example frame 804C in FIG. 8) is marked as a dependent record. In addition, the referenced stack location, for example 804E in FIG. 8, is recorded. Later during the first scan the referenced frame that holds this location is reached. The FrameRecord of this frame is denoted as Y. The method returns to the dependent FrameRecord X and records inside it a pointer to Y. In this fashion, during the first scan all dependent frames on their referenced frames are linked.

The second scan is initialized by the collector and is performed by the collector and the mutator together (the mutator also needs to install a new return barrier), in the same manner as the first scan. After the second scan is completed, the collector may proceed to the next phase. Now, before the mutator is about to access any stack frame, it will not only update the addresses in this frame, but also the addresses in all the referenced frames.

It is not required to recursively follow the referenced FrameRecords of the referenced record for languages which support the chain of reference variables only of length 2. Also, with this solution the maximal number of stack frames that might need to be scanned by the mutator in a single pause is still bounded and is known at a compile time.

Although specific details of exemplary methods are described with regard to the figures presented herein, it should be understood that certain acts shown in the figures need not be performed in the order described, and may be modified, and/or may be omitted entirely, depending on the circumstances. Moreover, the acts described may be implemented by a computer, processor or other computing device based on instructions stored on one or more computer-readable storage media. The computer-readable media can be any available storage media that can be accessed by a computing device to implement the instructions stored thereon including RAM, ROM, EEPROM, flash memory, optical disk, magnetic disk, and so forth.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system of incremental lock free stack frame scanning, the system comprising:
 a processor;
 a memory coupled to the processor and comprising computer readable storage medium storing instructions that, when executed by the processor, configure the processor to implement computer components comprising:
  a mutator stack comprising a mutator stack frame, the mutator stack frame comprising a pointer value;
  a summary data structure comprising a summary of the mutator stack frame;
  a mutator reading the mutator stack frame and creating a summary of the pointer value and inserting the summary of the pointer value into the summary data structure when an atomic insertion operation is successful, the mutator being permitted to read, or modify, or both, the mutator stack, and wherein the mutator inserts the summary of the pointer value into the summary data structure before modifying the contents of the mutator stack frame and the mutator installs a return barrier after the atomic insertion operation; and
  a garbage collector concurrently reading the mutator stack frame and creating a summary of the pointer and inserting the summary of the pointer into the summary data structure when an atomic insertion operation is successful, the garbage collector being permitted to read the mutator stack.

2. The system of claim 1 wherein the insertion operation comprises a compare-and-swap, or a double compare-and-swap, or a load-linked/store-conditional pair of instructions.

3. The system of claim 1 further comprising the garbage collector utilizing the summary data structure to find a root set.

4. A system comprising:
 a memory comprising a computer readable storage medium;
 a processor coupled to the memory;
 a garbage collector stored in the memory and configured to execute on the processor, concurrently scan a stack comprising stack frames, and read from the stack frame; and a mutator stored in the memory and configured to:
execute on the processor,
update a summary data structure comprising pointer values from the stack using an atomic insertion operation, during separate concurrent scans of the stack by the garbage collector and the mutator,
read, or modify, or both, the stack frame, and
install a return barrier after the atomic insertion operation.

5. The system of claim 4 wherein the garbage collector is configured to update a summary data structure using the atomic insertion operation, the update by the garbage collector occurring during separate concurrent scans of the stack by the garbage collector and the mutator.

6. The system of claim 5 wherein the summary data structure is used to determine garbage in memory.

7. The system of claim 5 wherein the mutator is configured to insert summary data into the summary data structure before modifying the contents of the stack frame.

8. The system of claim 5 wherein the insertion operation comprises a compare-and-swap, or a double compare-and-swap, or a load-linked/store-conditional pair of instructions, or a read-modify-write operation.

9. The system of claim 4 wherein the mutator and the garbage collector are configured to execute on the processor as separate threads.

10. A method comprising:
scanning a stack in a computer system comprising stack fragments concurrently with a garbage collector and a mutator;
updating a summary data structure in the computer system using an atomic insertion operation initiated by the garbage collector and updating the summary data structure in the computer system using an atomic insertion operation initiated by the mutator,
wherein each of the updatings occurs during separate concurrent scans of the stack by the garbage collector and the mutator, wherein the summary data structure comprises a pointer value from the stack;
permitting the garbage collector to read from the stack;
permitting the mutator to read, or write, or both, to the stack; and
installing, by the mutator, a return barrier after the atomic insertion operation.

11. The method of claim 10 further comprising using the information in the summary data structure as the basis for garbage collection.

12. The method of claim 10 further comprising the mutator inserting summary data into the summary data structure before modifying the contents of the stack fragment.

13. The method of claim 10 wherein the garbage collector waits for the mutator to acknowledge readiness when the mutator is active in a managed language environment.

* * * * *